(12) United States Patent
Min

(10) Patent No.: US 7,249,811 B2
(45) Date of Patent: Jul. 31, 2007

(54) APPARATUS FOR ASSEMBLING/DISASSEMBLING SCREEN OF PROJECTION TELEVISION

(75) Inventor: Sung-ki Min, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 210 days.

(21) Appl. No.: 10/435,382

(22) Filed: May 12, 2003

(65) Prior Publication Data

US 2003/0222541 A1    Dec. 4, 2003

(30) Foreign Application Priority Data

May 30, 2002    (KR) ............................... 2002-30302

(51) Int. Cl.
*A47B 5/00* (2006.01)
*A47G 29/00* (2006.01)

(52) U.S. Cl. ..................................... 312/7.2; 312/265.6

(58) Field of Classification Search ................. 312/7.2, 312/257.1, 265.6; 348/836; 411/411, 401, 411/409, 378, 399, 424, 426

See application file for complete search history.

(56) References Cited

U.S. PATENT DOCUMENTS

| 735,618 | A | * | 8/1903 | Tannewitz | ................... | 403/321 |
| 4,786,119 | A | * | 11/1988 | Smuda | ....................... | 312/195 |
| 5,215,332 | A | * | 6/1993 | De Sloovere | ............ | 280/801.1 |
| 6,637,163 | B2 | * | 10/2003 | Thibault et al. | .............. | 52/177 |

FOREIGN PATENT DOCUMENTS

JP    7-56234    3/1995

* cited by examiner

*Primary Examiner*—Milton Nelson, Jr.
(74) *Attorney, Agent, or Firm*—Staas & Halsey LLP (57) ABSTRACT

An apparatus for assembling/disassembling a screen of a projection television. The apparatus has a front mask, a plurality of brackets, and a plurality of lockers. The screen is placed on the front mask. The plurality of brackets are combined with the front mask so that the skirt of the screen closely contacts the front mask. Each bracket has a plurality of slot portions that have first slots, and second slots that extend from the first slots, widths of the second slots being smaller than widths of the first slots. The plurality of lockers are combined with the front mask and include guides that are inserted into the second slots and stoppers that extend from the guides. Diameters of the guides are smaller than the widths of the first slots and greater than widths of the second slots.

22 Claims, 7 Drawing Sheets

APPARATUS FOR ASSEMBLING/DISASSEMBLING SCREEN OF PROJECTION TELEVISION

BACKGROUND OF THE INVENTION

This application claims the priority of Korean Patent Application No. 2002-30302 filed on May 30, 2002 in the Korean Intellectual Property Office, the disclosure of which is incorporated herein in its entirety by reference.

1. Field of the Invention

The present invention relates to an apparatus for assembling/disassembling a screen of a projection television, and more particularly, to an apparatus for assembling/disassembling a screen of a projection television having an improved structure, so that the screen can be easily assembled/disassembled.

2. Description of the Related Art

In general, a projection television projects an image on the rear surface of a screen using a projector. A screen assembling/disassembling apparatus is disposed in a front of a cabinet of the projection television to assemble/ disassemble the screen on which the image projected by the projector is displayed.

Figure 1:
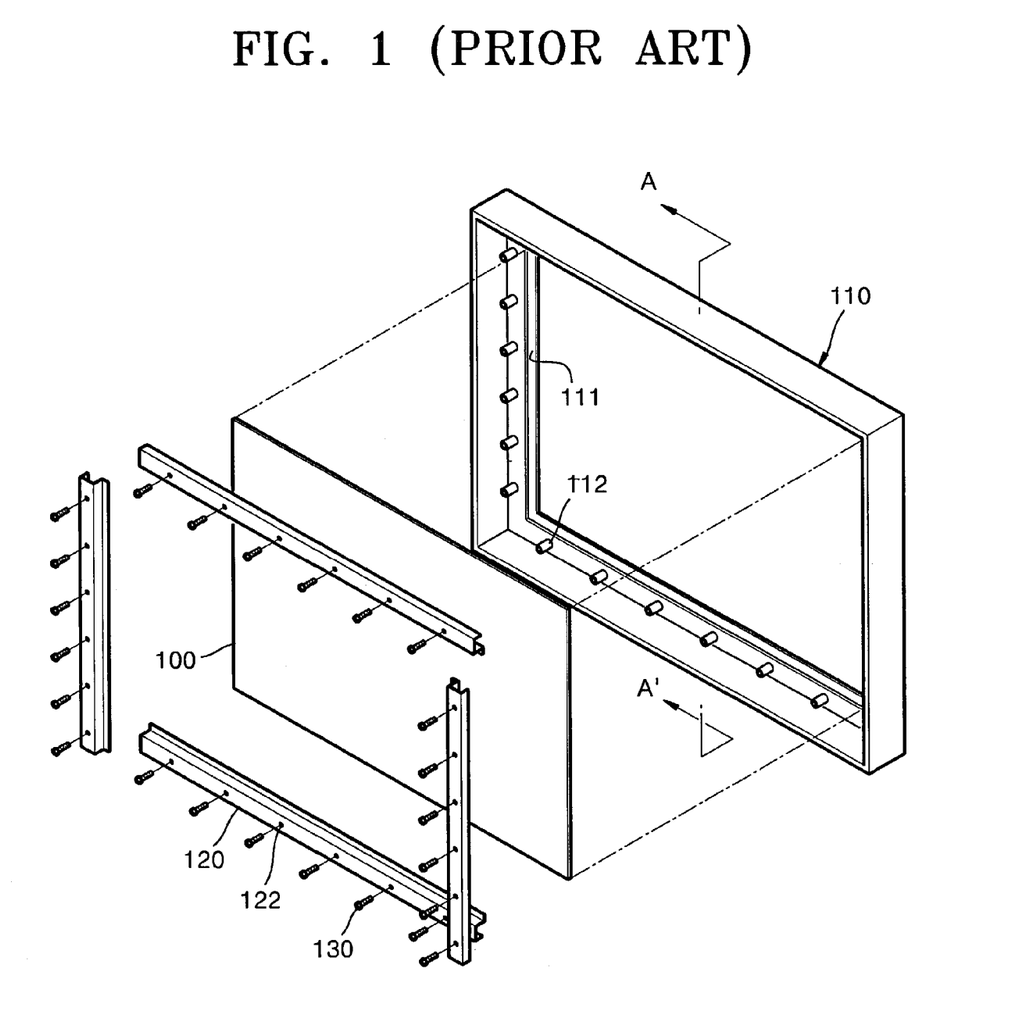
FIG. 1 is an exploded perspective view of a conventional apparatus for assembling a screen of a projection television.
Figure 2:
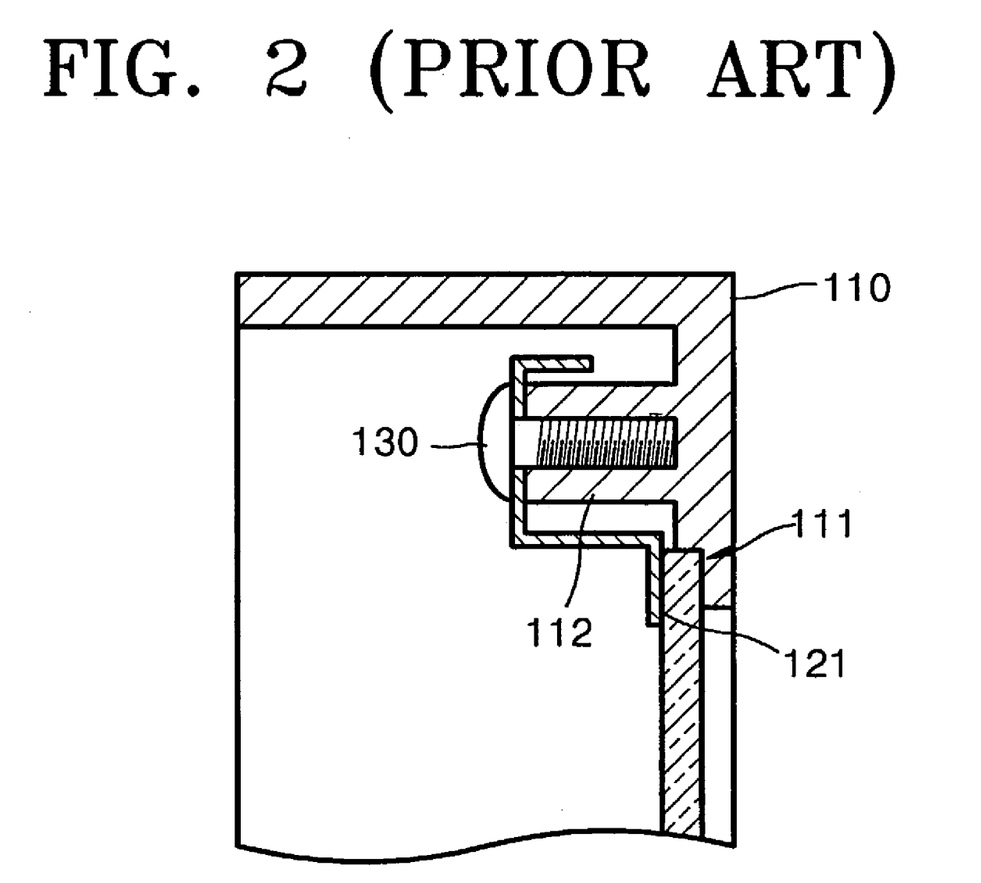
FIG. 2 is a cross-sectional view taken along line A-A' of FIG. 1

FIG. 1 is an exploded perspective view of a conventional apparatus for assembling a screen of a projection television and FIG. 2 is a cross-sectional view taken along line A-A' of FIG. 1. As shown in FIGS. 1 and 2, the conventional apparatus has a screen 100, a front mask 110 on which the screen 100 is placed, and holders 120 which fix the screen 100 to the front mask 110.

The front mask 110 is connected to a cabinet (not shown) in which a projector (not shown) projecting an image is installed. The front mask 110 includes a surface 111 on which the screen 100 is placed, and a plurality of screw bosses 112 to which screws 130 are coupled to combine the holders 120 with the front mask 110.

The holders 120, which fix the screen 110 to the front mask 110, have contact portions 121 that contact the screen 100 and a plurality of holes 122 that the screws 130, coupled to the screw bosses, 112 pass through.

To install the screen 100 in the above-described structure, first, the screen 110 is put on the surface 111 of the front mask 110. Next, the holders 120 are placed on the front mask 110 so that the contact portions 121 of the holders 120 contact the skirt of the screen 100. Thereafter, the screws 130 are inserted through the holes 122 and screwed into the screw bosses 112, so that the screen 100 is pushed toward the surface 111 of the front mask 110 and secured.

Since the screen 100 used in the projection television is generally a screen of more than 40 inches, twenty or more screws 130 are generally used to firmly secure the screen 100 onto the surface 111 of the front mask 100. Among a series of processes to assemble the projection television, installing the screen 100 onto the front mask 110 requires a disproportionate amount of time, compared to other processes. As a result, process balance is lost. Additionally, twenty or more screws 130 have to be unscrewed to disassemble the screen 100 for post assembly service of the screen.

SUMMARY OF THE INVENTION

Accordingly, the present invention provides an apparatus for assembling/dissembling a screen of a projection television in which the number of screws for fixing the screen can be reduced to maintain a balance of processes of assembling the projection television, and which post-assembly service efficiency can be increased.

According to an aspect of the present invention, there is provided an apparatus for assembling/disassembling a screen of a projection television that includes a front mask, a plurality of brackets, and a plurality of lockers. The screen is placed on the front mask. The plurality of brackets are combined with the front mask, so that a skirt of the screen closely contacts the front mask, and each bracket includes a plurality of slot portions that have first slots, and second slots that extend from the first slots, wherein widths of the second slots are smaller than widths of the first slots. The plurality of lockers are combined with the front mask, and include guides that are inserted into the second slots and stoppers that extend from the guides, wherein widths of the stoppers are smaller than the widths of the first slots and greater than widths of the second slots, and widths of the guides are smaller than widths of the second slots.

According to one aspect, the slot portions are formed in a longitudinal direction of the brackets. According to another aspect, the slot portions are formed in a widthwise direction of the brackets.

According to one aspect, lockers are special screws that have threads that extend from a side of the guide opposite the stopper, and that are screwed into the front mask. According to one aspect, external diameters of the threads are smaller than external diameters of the guides. According to another aspect, external diameters of the threads are approximately equal to external diameters of the guides.

According to one aspect, the front mask has a plurality of fixing bosses, and each bracket has a hole corresponding to one of the plurality of fixing bosses, wherein a screw is inserted through each bracket hole, and screwed into the corresponding fixing boss, to secure each bracket to the front mask.

According to one aspect, a length of each guide is greater than a thickness of each bracket.

Additional aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE INVENTION

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Figure 3A:
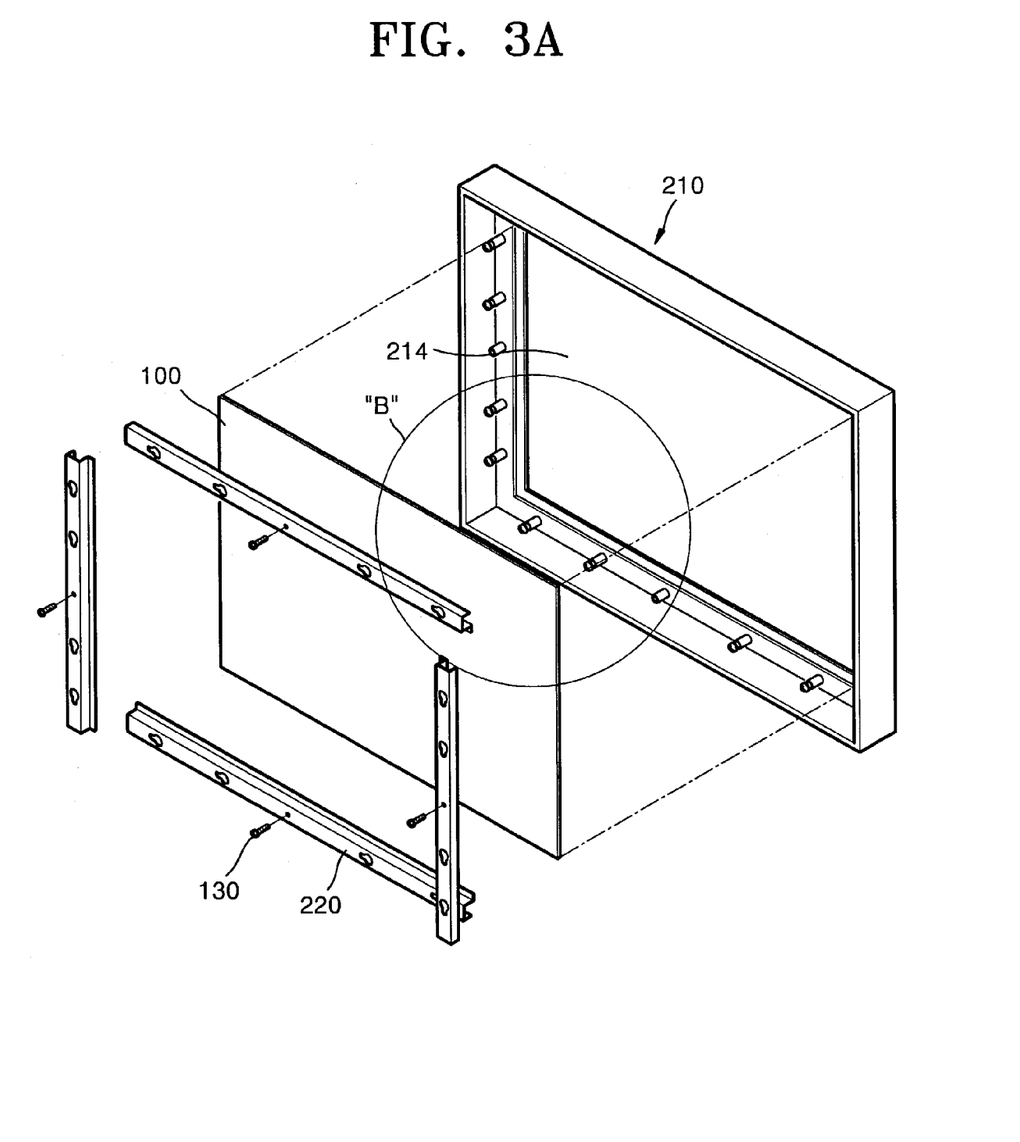
FIG. 3A is an exploded perspective view of a screen assembling apparatus according to an embodiment of the present invention.
Figure 3B:
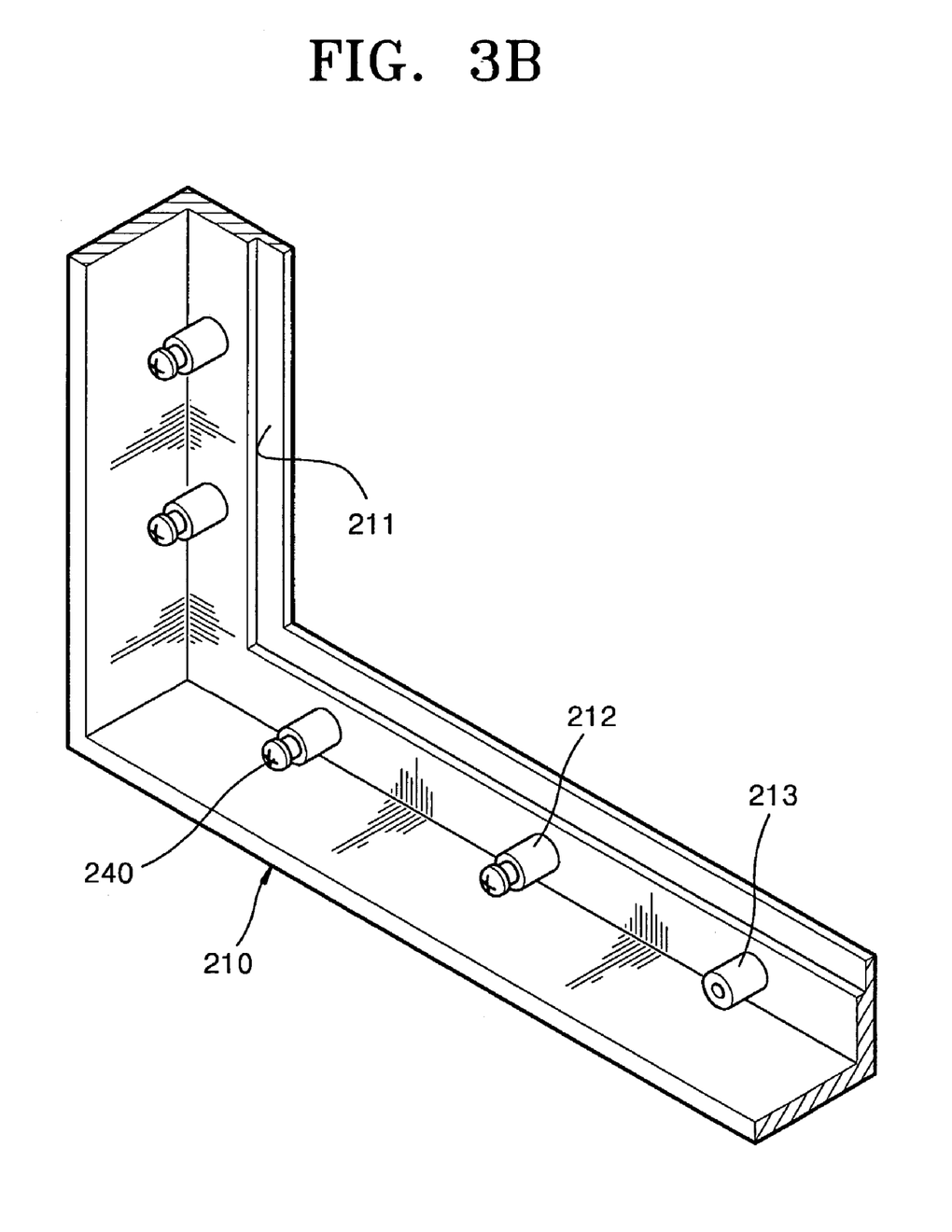
FIG. 3B is a detailed perspective view of portion B of FIG. 3A.

As shown in FIGS. 3A and 3B, a screen assembling/disassembling apparatus includes a front mask 210 on which a screen 100 is placed; lockers 240, which are coupled to the front mask 210; and brackets 220, that connect with the lockers 240 to hold the screen 100 against the front mask 210.

The front mask 210 has a hollow 214 smaller than the size of the screen 100; a surface 211 on which to place the screen 100, that is formed along a skirt of the hollow 214, in the rear of the front mask 210; and a plurality of screw bosses 212, to which lockers 240 are coupled. Fixing bosses 213, to which the screws 130 are coupled, are located on the skirt of the hollow 214.

According to one aspect, the screw bosses and the lockers are combined into single units, engagers (not shown). According to another aspect, engagers are integrally formed with the front mask.

Figure 4:
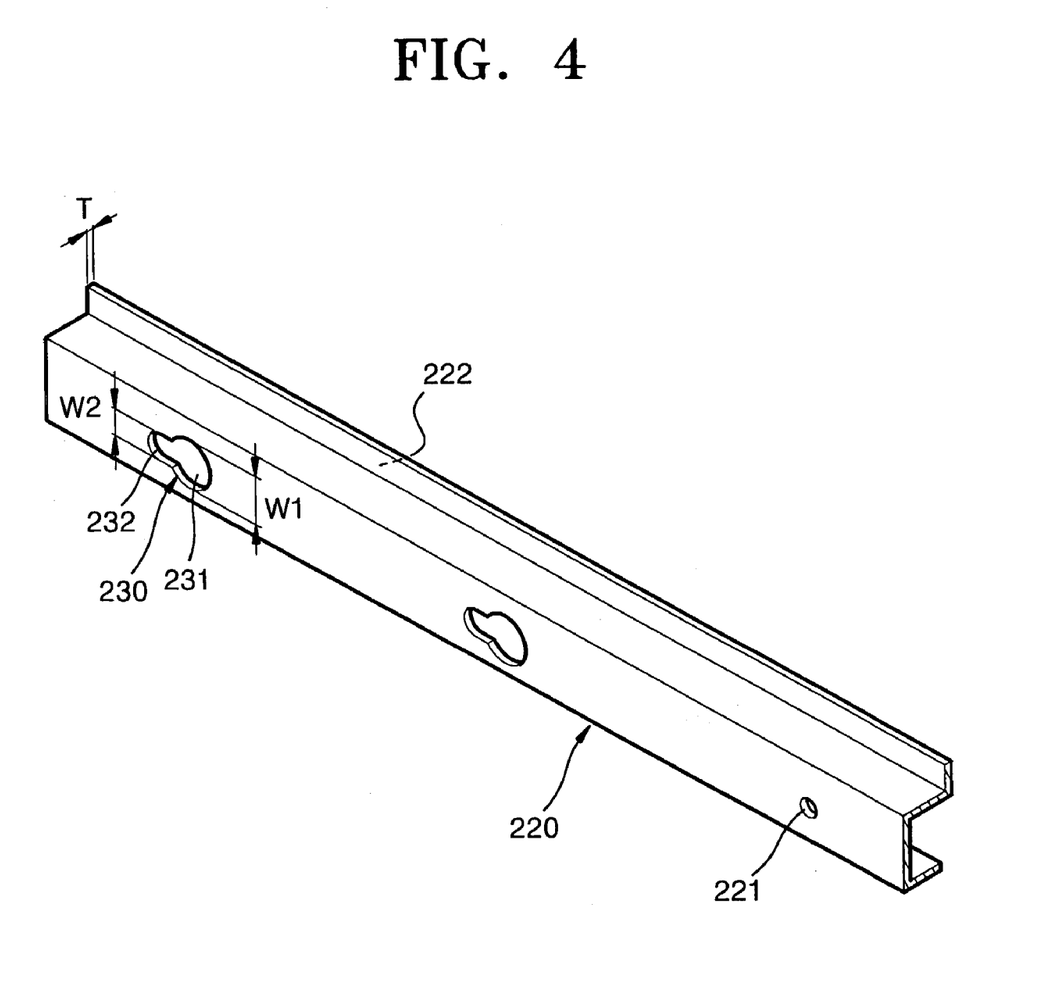
FIG. 4 is a detailed perspective view of a bracket of FIG. 3A.

Referring again to FIGS. 3A and 3B, the brackets 220 connect to the front mask 210 to hold the edge of the screen 100 against the surface 211 of the front mask 210. As shown in FIG. 4, each of the brackets 220 has a contact portion 222 that contacts the edge of the screen 100; a hole 221, located in the center of each of the brackets 220, to insert the screw 130 thereinto; and four slot portions 230. According to one aspect, the slot portions 230 are created in a longitudinal direction of the brackets 220 and have first slots 231, and second slots 232 that extend from the first slots 231. Widths W1 of the first slots 231 are greater than widths W2 of the second slots 232. According to another aspect, the slot portions 230 are created in a widthwise direction of the brackets 220 that is perpendicular to the longitudinal direction.

The lockers 240 are coupled to the slot portions 230 to combine the brackets 220 with the front mask 210.

Figure 5:
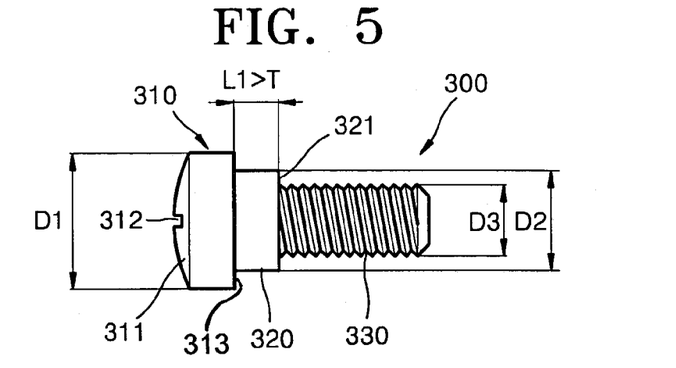
FIG. 5 is a cross-sectional view of a locker of FIG. 3A.

According to one aspect, the lockers 240 are first special screws 300, as shown in FIG. 5. Each of the first special screws 300 has a stopper 310, a guide 320, and a thread 330. An external diameter D1 of the stopper 310 is slightly smaller than the width W1 of the first slot 231, so that the stopper 310 is inserted into the first slot 231. According to one aspect, a groove 312 is formed in an upper surface 311 of the stopper 310 to engage with a tool, such as a screwdriver (not shown). The guide 320, onto which the second slot 232 is inserted, extends from a lower surface 313 of the stopper 310. According to one aspect, an external diameter D2 of the guide 320 is slightly smaller than the width W2 of the second slot 232. According to another aspect, a length L1 of the guide 320 is slightly greater than a thickness T of the bracket 220. The thread 330, which is screwed into the screw boss 212 on the front mask 210, extends from the guide 320.

According to one aspect, an external diameter D3 of the thread 330 is smaller than the external diameter D2 of the guide 320.

As shown in FIG. 5, the external diameter D3 of the thread 330 is smaller than the external diameter D2 of the guide 320. Thus, when the special screw 300 is combined into the screw boss 212, an end 321 of the guide 320 contacts the upper surface of the screw boss 212. As a result, a sliding space is naturally made by the length L1 of the guide 320, regardless of the depth of the screw boss 212.

Figure 6:
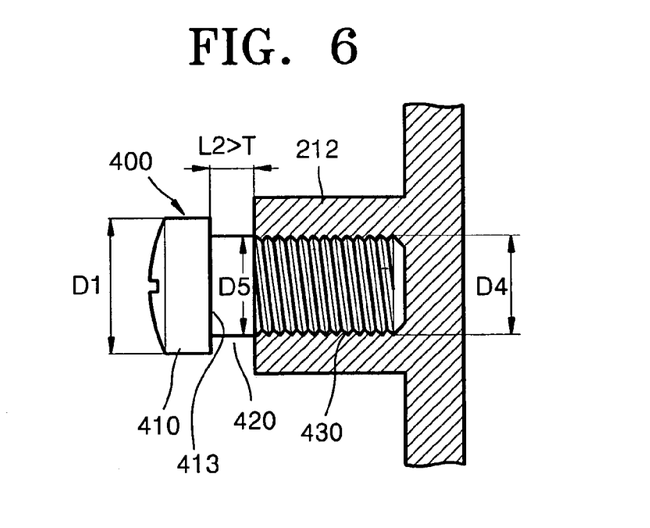
FIG. 6 is a cross-sectional view of the locker of FIG. 3A, according to another embodiment of the present invention.

According to another aspect, as shown in FIG. 6, a second special screw 400 is used instead of the first special screw 300. An external diameter D4 of a thread 430 is equal to an external diameter D5 of a guide 420, and the screw boss 212 is shaped so that when a second special screw 400 is completely combined into the screw boss 212, a distance L2 between an upper surface of the screw boss 212 and a lower surface 413 of a stopper 410 is slightly greater than the thickness T of the bracket 220. Additionally, the external diameter D5 of the guide 420 is slightly smaller than the width W2 of the second slot 232.

Figure 7:
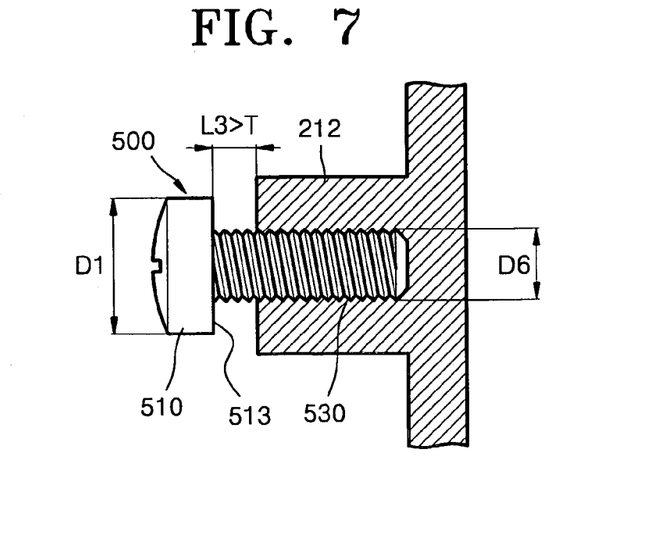
FIG. 7 is a cross-sectional view of the locker of FIG. 3A, according to still another embodiment of the present invention.

According to yet another aspect, as shown in FIG. 7, a third special screw 500 is used instead of the first special screw 300. The third special screw 500 has a thread 530 with an external diameter D6, which is smaller than an external diameter D1 of the stopper 510, and extends from a lower surface 513 of a stopper 510. The third special screw 500 does not have a guide. As described with reference to FIG. 6, when a special screw 500 is completely screwed into the screw boss 212, a distance L3 between the upper surface of the screw boss 212 and the lower surface 513 of the stopper 510 is slightly greater than the thickness T of the bracket 220. The external diameter D6 of the screw 530 is slightly smaller than the width W2 of the second slot 232.

A method of assembling the screen of the projection television with the above-described structure will now be described.

To improve process balance in the assembling/disassembling the projection television, it is preferable that the special screws 300 are combined into the front mask 210, in the first operation. The guide 320 is positioned between the upper surface of the screw boss 212 and the lower surface 313 of the stopper 310. Then, the first special screw 300 is screwed into the screw boss 212 of the front mask 210. In this embodiment, since four screw bosses 212 are respectively installed on four portions of the skirt of the hollow 214 of the front mask 210, sixteen first special screws 300 are required.

Next, the screen 100 is placed on the surface 211 of the front mask 210.

Figure 8:
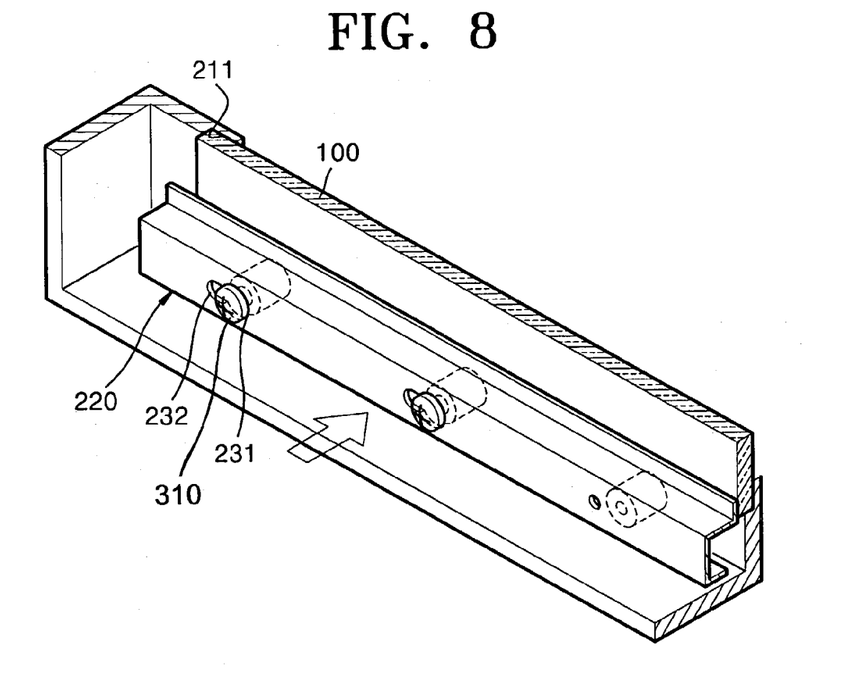
FIG. 8 is a detailed perspective view of the screen assembling/disassembling apparatus, of FIG. 3A, before being locked.

Then, as shown in FIG. 8, the brackets 220 are inserted onto the first special screws 300 so that the stoppers 310 of the first special screws 300 are inserted through the first slots 231 of the brackets 220 and the brackets 220 contact the screw bosses 212.

Figure 9:
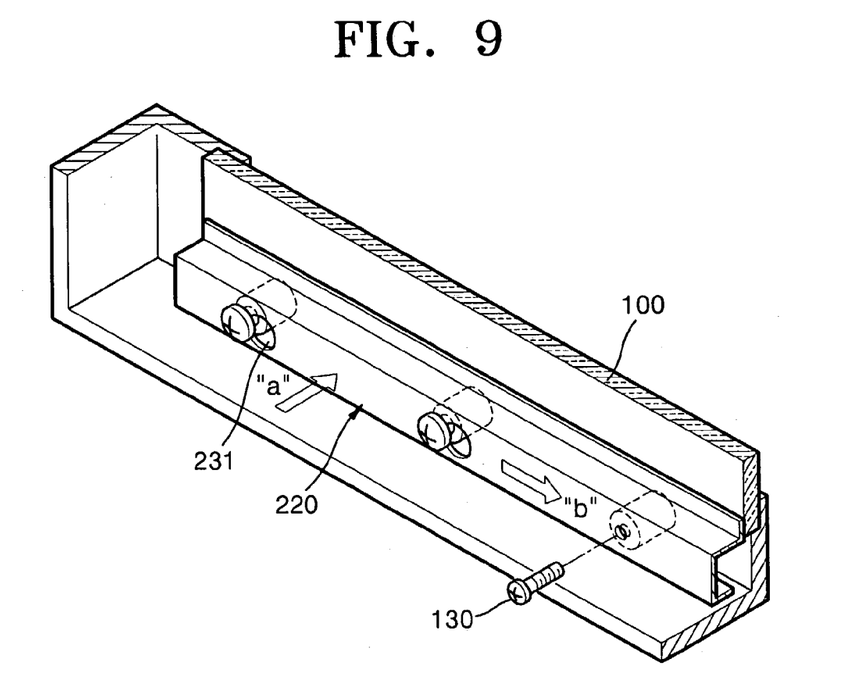
FIG. 9 is a detailed perspective view of the screen assembling/disassembling apparatus, of FIG. 3A, after being locked.

Then, as shown in FIG. 9, the brackets 220 are lightly pushed in direction "a", and then, in direction "b", so that the guides 320 are inserted into the second slots 232. Then, since the widths W2 of the second slots 232 are smaller than the external diameters D1 of the stoppers 310, upper surfaces of the brackets 220 engage the lower surfaces 313 of the stoppers 310, so that the brackets 220 are secured to the stoppers 313. Thus, the brackets 220 are secured to the front mask 210 along the skirt of the screen 100.

According to one aspect, if the slot portions 230 are formed in the widthwise direction of the brackets 220, then to secure the brackets to the stoppers 310, the brackets 320 are first lightly pushed in direction "a", and then in the widthwise direction of the brackets 220, so that the brackets 220 are locked to the front mask 210.

Finally, the screws 130 are screwed, through the holes 221, into the fixing bosses 213 to completely secure the brackets 220, so that the screen 100 is secured to the front mask 210.

When the screen 100 is assembled according to the above-described method, only four screws 130 are required to assemble the screen 100 in the processes of assembling the projection television. Thus, the time required for combining the screws 130 can be considerably reduced compared with the time required in case of conventional screen assembling/disassembling apparatus. Also, the screen 100 can be disassembled by unscrewing only four screws 130 to service the screen 100 after the initial assembly.

The screen assembling/disassembling apparatus, according to the present invention, shown in FIG. 3A does not have to include four brackets. The brackets may form a single body in which upper and lower parts of slot portions may be formed in the longitudinal direction and right and left parts of the slot portions may be formed in the widthwise direction of the single body. Alternatively, upper and lower parts of slot portions may be formed in the widthwise direction, and right and left parts of the slot portions may be formed in the longitudinal direction of the single body.

In the apparatus for assembling/disassembling a screen of a projection television according to the present invention, the time required for assembling the screen can be shortened to improve process balance. Also, since the screen can be easily disassembled and assembled when replacing the screen, post-assembly service efficiency can be improved.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An assembly of a projection television for use with a screen to retain the screen, the assembly comprising:
    a front mask on which a screen is placeable;
    a plurality of brackets, that are combined with the front mask so that a skirt of a screen placed on the front mask closely contacts the front mask, and include a plurality of slot portions that have
        first slots, and
        second slots that extend from the first slots, wherein widths of the second slots are smaller than widths of the first slots; and
    a plurality of lockers that are combinable with the front mask, and include
        guides that are inserted into the second slots, and
        stoppers that extend from the guides,
    wherein widths of the stoppers are smaller than the widths of the first slots and greater than widths of the second slots, and widths of the guides are smaller than widths of the second slots,
    the front mask has a plurality of fixing bosses,
    each bracket has a non-slotted hole that corresponds to one of the plurality of fixing bosses, and
    a screw is inserted through only each respective non-slotted bracket hole and screwed into the corresponding fixing boss, to secure each bracket to the front mask, and prevent the brackets from sliding along respective longitudinal axes of the brackets and disengaging from the lockers.

2. The assembly of claim 1, wherein:
the slot portions are formed along the respective longitudinal axes of the brackets.

3. The assembly of claim 1, wherein:
the slot portions are formed in a widthwise direction of the brackets.

4. The assembly of claim 1, wherein:
each locker is a screw that has a thread that extends from a side of the guide opposite the stopper, and that is screwed into the front mask.

5. The assembly of claim 4, wherein:
an external diameter of the thread is smaller than the width of the guide.

6. The apparatus of claim 4, wherein:
an external diameter of the thread approximately equals the width of the guide.

7. The assembly of claim 1, wherein:
a length of each guide is greater than a thickness of each bracket.

8. An arrangement of a projection television for use with a screen to retain the screen, the arrangement comprising:
    a front mask on which the screen is mountable;
    a locker, having
        a stopper at a first end, and
        a guide that extends from the stopper;
    a screw boss, located on the front mask, and to which the locker is attached, such that the screw boss contacts the guide at a side of the guide opposite the stopper;
    a fixing boss located on the front mask; and
    a bracket having
        a first slot,
        a second slot that extends from the first slot in a first direction, and
        a non-slotted bracket hole separate from the first and second slots, and corresponding to the fixing boss,
    wherein
        a first slot dimension is greater than a stopper dimension,
        the stopper dimension is greater than a second slot dimension,
        the second slot dimension is greater than a guide dimension,
        the bracket is installed to the front mask, so that the bracket engages the screen by passing the stopper through the first slot and sliding the bracket in a direction that is co-linear and opposite to the first direction, thereby engaging the stopper with the bracket, engaging the guide with the second slot, and securing the screen to the front mask, and
        a screw is inserted through only the non-slotted bracket hole and screwed into the corresponding fixing boss, to secure the bracket to the front mask and prevent the bracket from sliding along a longitudinal axis of the bracket and disengaging from the stopper.

9. The arrangement of claim 8, wherein:
the first direction is along the longitudinal axis of the bracket.

10. The arrangement of claim 8, wherein:
the first direction is a widthwise direction of the bracket.

11. The arrangement of claim 8, wherein:
a length of the guide is greater than a thickness of the bracket.

12. The arrangement of claim 8, wherein:
the locker is a screw that has a thread that extends from a side of the guide opposite the stopper, and that is screwed into the screw boss.

13. The arrangement of claim 12, wherein:
an external diameter of the thread is smaller than the width of the guide.

14. The apparatus of claim 12, wherein:
an external diameter of the thread approximately equals the width of the guide.

15. An assembly of a projection television for use with a screen to retain the screen, the assembly comprising:
a front mask on which the screen is mountable;
a locker, having
a stopper at a first end, and
an extended portion that extends from the stopper;
a screw boss, located on the front mask, and to which the locker is attached;
a fixing boss, located on the front mask; and
a bracket having
a first slot,
a second slot that extends from the first slot in a first direction, and
a non-slotted bracket hole, separate from the first and second slots, and corresponding to the fixing boss,
wherein
a first slot dimension is greater than a stopper dimension,
the stopper dimension is greater than a second slot dimension,
the second slot dimension is greater than an extended portion dimension, and
the bracket is installed to the front mask, so that the bracket engages the screen by passing the stopper through the first slot and sliding the bracket in a direction that is co-linear and opposite to the first direction, thereby engaging the stopper with the bracket, engaging the extended portion with the second slot, and securing the screen to the front mask, and
a screw is inserted through only the non-slotted bracket hole and screwed into the corresponding fixing boss, to secure the bracket to the front mask and prevent the bracket from sliding along a longitudinal axis of the bracket and disengaging from the stopper.

16. The assembly of claim 15, wherein:
the first direction is along the longitudinal axis of the bracket.

17. The assembly of claim 15, wherein:
the first direction is a widthwise direction of the bracket.

18. The assembly of claim 15, wherein:
a distance between the screw boss and the stopper is greater than a thickness of the bracket.

19. The assembly of claim 15, wherein the locker is a screw and the extended portion comprises:
a guide that extends from the stopper; and
a thread that extends from a side of the guide opposite the stopper, and that is screwed into the screw boss,
wherein the second slot dimension is greater than an external diameter of the guide, and the external diameter of the guide is greater than an external diameter of the thread.

20. The apparatus of claim 15, wherein the locker is a screw and the extended portion comprises:
a guide that extends from the stopper; and
a thread that extends from a side of the guide opposite the stopper, and that is screwed into the screw boss,
wherein the second slot dimension is greater than an external diameter of the guide, and the external diameter of the guide is approximately equal to an external diameter of the thread.

21. The apparatus of claim 15, wherein the locker is a screw and the extended portion comprises:
a thread that is screwed into the screw boss,
wherein the second slot dimension is greater than an external diameter of the thread.

22. An arrangement of a projection television for use with a screen to retain the screen, the arrangement comprising:
a plurality of engagers positioned on a front mask, the engagers including
a guide portion, and
a stopper portion extending from the guide portion;
a fixing boss positioned on the front mask; and
a bracket, engaging and simultaneously locking with the engagers through a movement of the bracket, to secure the screen to the front mask, the bracket having
a plurality of slot portions, the slot portions having first slots, and second slots extending from the first slots, widths of the second slots being smaller than widths of the first slots, and
a non-slotted bracket hole corresponding with the fixing boss,
wherein widths of the stopper portions are smaller than the widths of the first slots and greater than widths of the second slots, and widths of the guide portions are smaller than widths of the second slots, and
a screw is inserted through only the non-slotted bracket hole and screwed into the corresponding fixing boss, to secure the bracket to the front mask and prevent the bracket from sliding along a longitudinal axis of the bracket and disengaging from the engagers.

* * * * *